(12) United States Patent
Kojima et al.

(10) Patent No.: US 7,507,502 B2
(45) Date of Patent: Mar. 24, 2009

(54) NEGATIVE ELECTRODE HAVING INTERMETALLIC COMPOUND THAT OCCLUDES/DESORBS LITHIUM AS AN ACTIVE MATERIAL LAYER ON COLLECTOR FOR NON-AQUEOUS SECONDARY BATTERY AND NON-AQUEOUS SECONDARY BATTERY USING THE SAME

(75) Inventors: Eri Kojima, Ibaraki (JP); Hiromu Sugiyama, Suita (JP); Atsushi Ueda, Hirakata (JP); Shigeo Aoyama, Otsu (JP)

(73) Assignee: Hitachi Maxell, Ltd., Osaka (JP)

( * ) Notice: Subject to any disclaimer, the term of this patent is extended or adjusted under 35 U.S.C. 154(b) by 607 days.

(21) Appl. No.: 10/810,505

(22) Filed: Mar. 26, 2004

(65) Prior Publication Data

US 2004/0219432 A1     Nov. 4, 2004

(30) Foreign Application Priority Data

Mar. 28, 2003    (JP)   ............................ 2003-089525

(51) Int. Cl.
*H01M 4/58*      (2006.01)
*H01M 4/72*      (2006.01)

(52) U.S. Cl. ................. 429/218.1; 429/231.5; 429/225; 429/233; 429/221; 429/224; 429/245

(58) Field of Classification Search .................. 429/245, 429/233, 218.1, 219, 220, 221, 224, 225, 429/231.5; 252/518.1, 520.1, 521.2; 420/470, 420/560
See application file for complete search history.

(56) References Cited

U.S. PATENT DOCUMENTS

2002/0177044 A1   11/2002   Yagi et al. ............... 429/231.95

2003/0180619 A1*   9/2003   Tamura et al. ......... 429/231.95

FOREIGN PATENT DOCUMENTS

JP    2001-256968        9/2001
JP    2002-373647 A     12/2002
WO    WO 02/25757     *   3/2002

OTHER PUBLICATIONS

Patent Abstracts of Japan, publication No. 2001-256968, publication date Sep. 21, 2001, 1 page.
Robert A. Huggins, "Lithium alloy negative electrodes formed from convertible oxides" Solid State Ionics, 113-115 (1998), p. 57-67.
Noriyuki Tamura et al., "Study on the anode behavior of Sn and Sn-Cu alloy thin-film electrodes", Journal of Power Sources 107 (2002) p. 48-55.
D. Larcher et al., "In Situ X-Ray Study of the Electrochemical Reaction of Li and n'-Cu6Sn5" Journal of The Electrochemical Society, 147 (2000), p. 1658-1662 5 pages.

* cited by examiner

*Primary Examiner*—Raymond Alejandro
(74) *Attorney, Agent, or Firm*—Birch, Stewart, Kolasch & Birch, LLP

(57) ABSTRACT

A negative electrode of the present invention has an active material layer composed of an intermetallic compound on a collector. The intermetallic compound is capable of occluding/desorbing lithium and contains at least one kind of element A selected from Sn, In, Ge, Ga, Pb, Al, Sb, and Si, and an element X that does not substantially react with Li. In the negative electrode, a ratio $I_b/I_a$ of highest peak intensities $I_a$ and $I_b$ of X-ray diffraction peaks derived from the intermetallic compound and the element A is 0.1 or less. By configuring a non-aqueous secondary battery using the above-mentioned negative electrode, the charging/discharging efficiency and cycle characteristics of a thin film electrode used for the negative electrode of the non-aqueous secondary battery are enhanced.

8 Claims, 5 Drawing Sheets

NEGATIVE ELECTRODE HAVING INTERMETALLIC COMPOUND THAT OCCLUDES/DESORBS LITHIUM AS AN ACTIVE MATERIAL LAYER ON COLLECTOR FOR NON-AQUEOUS SECONDARY BATTERY AND NON-AQUEOUS SECONDARY BATTERY USING THE SAME

BACKGROUND OF THE INVENTION

1. Field of the Invention

The present invention relates to a negative electrode for a non-aqueous secondary battery containing an intermetallic compound capable of occluding/desorbing lithium as an active material, and a non-aqueous secondary battery using the negative electrode.

2. Description of the Related Art

Recently, there is a rapid increase in demand for portable terminal equipment such as a mobile telephone, a notebook personal computer, and a personal digital assistant (PDA). Along with the miniaturization, weight reduction, and increase in functionality of such equipment, there also is a demand for an increase in energy density in a non-aqueous secondary battery used as a power source. However, the capacity of a currently commercialized carbon negative electrode has reached a value dose to a theoretical value, so that it is necessary to develop a negative electrode material with a higher capacity.

A non-aqueous secondary battery using a negative electrode containing Al, Si, Sn, and the like that are alloyed with Li during charging as active materials has been reported (see Solid State Ionics, 113-115, p. 57 (1998)). These active materials are considered as prospects as negative electrode materials due to their very high density of mass capacity and volume capacity, compared with those of a carbon negative electrode.

Among the above-mentioned metal, particularly, Sn has an electron conductivity, so that it is not necessary to add a conductive assistant. Therefore, Sn enables a thin film electrode to be produced by electroless plating, electroplating, sputtering, or the like, in addition to a conventional coated electrode. As a result, Sn is expected to achieve the remarkable enhancement of a battery capacity, improvement of cycle characteristics, simplification of a production process, and the like.

In the case of using pure Sn, pure Si, and the like as negative active materials, Li is inserted/desorbed efficiently with respect to the negative active materials during charging in an initial cycle period, whereby a high capacity is achieved. However, as a charging/discharging cycle proceeds, the capacity is decreased remarkably. The reason for this is as follows. The volume of the active material particles is greatly changed along with the insertion/desorption of Li, so that the active material particles are pulverized due to the expansion and shrinkage, whereby the electron conductivity in the electrode becomes insufficient. Thus, in order to enhance cycle characteristics, this problem needs to be solved.

As means for solving the above-mentioned problem, JP2001-256968A shows that a copper foil is plated with an alloy such as Sn-Ni, and this plating is used as an active material.

Furthermore, Journal of Power Sources (107, p. 48-55 (2002)) shows that a Sn thin film formed on a Cu foil by electroplating is heat-treated at a temperature in the vicinity of the melting point of Sn, whereby a thin film having a gradient structure is obtained in which Cu atoms and Sn atoms interdiffuse at an interface between Cu and Sn. More specifically, a collector reacts with a Sn thin film to form a Cu—Sn alloy having a laminated configuration of $Cu/Cu_3Sn/Cu_6Sn_5/Sn$, etc., and the intermetallic compound is used as an active material. $Cu_6Sn_5$ occludes Li to form Cu and $Li_{4.4}Sn$ that are electron conductors during charging, and desorbs Li to return to $Cu_6Sn_5$ during discharging. Therefore, $Cu_6Sn_5$ enables repetitive charging/discharging (see Journal of Electrochemical Society, 147, p. 1658-1662 (2000)).

However, a $Cu_3Sn$ phase does not desorb Li after occluding Li. Therefore, Li to be occluded is not discharged, and consequently, reversible charging/discharging cannot be performed. Furthermore, a Sn phase has the following problem. The Sn phase is pulverized due to the repetitive charging/discharging to decrease cycle characteristics, and also functions as a catalyst for decomposing an electrolyte solution. Furthermore, it has been clarified that, in the case of the Sn phase, depending upon the selection of a material for a collector, an active material layer and a collector react with each other gradually along with the progress of a charging/discharging cycle, which degrades the characteristics of an electrode. In order to further enhance the characteristics of an electrode, it is important to minimize an intermetallic compound phase having poor reversibility with respect to occlusion/desorption of lithium and an unreacted phase, such as the $Cu_3Sn$ phase and the Sn phase, and to efficiently form an intermetallic compound capable of occluding/desorbing lithium as in the $Cu_6Sn_5$ phase. Furthermore, it also is important to suppress the reaction between the active material layer and the collector during charging/discharging.

SUMMARY OF THE INVENTION

A negative electrode for a non-aqueous secondary battery of the present invention includes an intermetallic compound capable of occluding/desorbing lithium as an active material layer on a collector. The intermetallic compound contains at least one kind of element A selected from Sn, In, Ge, Ga, Pb, Al, Sb, and Si, and an element X that does not substantially react with Li. In X-ray diffraction measurement with a CuKα-ray of the active material layer, assuming that highest peak intensities of diffraction lines derived from the intermetallic compound and the element A are $I_a$ and $I_b$, respectively, an intensity ratio $I_b/I_a$ is 0.1 or less.

Furthermore, a negative electrode for a non-aqueous secondary battery of the present invention includes an intermetallic compound capable of occluding/desorbing lithium as an active material layer on a collector. The intermetallic compound contains at least one kind of element A selected from Sn, In, Ge, Ga, Pb, Al, Sb, and Si, and an element X that does not substantially react with Li, and a protective layer for preventing a reaction between the active material layer and the collector is provided therebetween.

Furthermore, a negative electrode for a non-aqueous secondary battery of the present invention includes an active material layer substantially composed of a single phase of an intermetallic compound capable of occluding/desorbing lithium. The active material layer is formed by alternately laminating, on a collector, a thin film with a thickness of 10 μm or less containing at least one kind of element A selected from Sn, In, Ge, Ga, Pb, Al, Sb, and Si and a thin film containing at least one kind of element X selected from Cu, Ni, Fe, Mn, Co, Cr, Mo, W, Ti, and Zr, thereby forming a laminated film, and heat-treating the laminated film.

The above-mentioned negative electrode for a non-aqueous secondary battery of the present invention is combined with a conventional general-purpose positive electrode, a non-aqueous electrolyte, a separator, and the like to form a non-aqueous secondary battery.

These and other advantages of the present invention will become apparent to those skilled in the art upon reading and understanding the following detailed description with reference to the accompanying figures.

DESCRIPTION OF THE PREFERRED EMBODIMENTS

Figure 1:
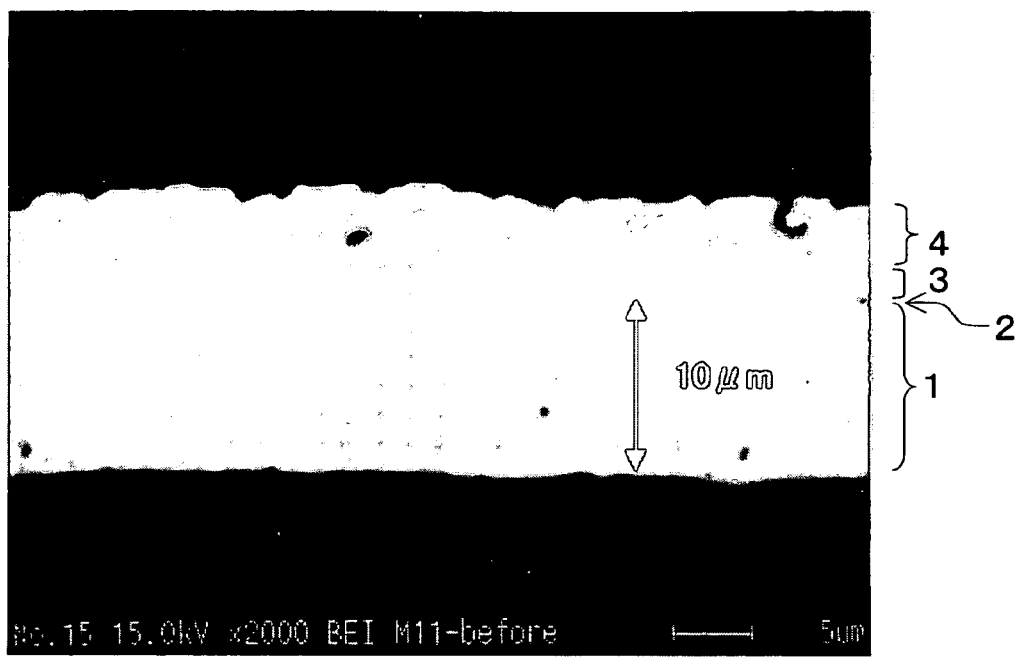
FIG. 1 is an electron micrograph showing a cross-sectional configuration of a laminate in which a laminated film composed of a protective layer, a Cu thin film, and a Sn thin film is formed on a collector, used in a production process of a negative electrode in Example 1.

The above-mentioned conventional problems apply to elements such as In, Ge, Ga, Pb, Al, Sb, and Si, as well as Sn. One or more embodiments of the present invention solve the problems of a thin film electrode used in a negative electrode of a conventional non-aqueous secondary battery, and provide a non-aqueous secondary battery excellent in a charging/discharging efficiency and cycle characteristics.

In the negative electrode of the present invention, the generation of an intermetallic compound phase having poor reversibility and the remaining of an unreacted phase are suppressed, and an intermetallic compound phase having high reversibility is formed efficiently. Therefore, by combining such a negative electrode with a positive electrode and a non-aqueous electrolyte, a non-aqueous secondary battery excellent in a charging/discharging efficiency and cycle characteristics can be obtained.

In the negative electrode of the present invention, an intermetallic compound to be an active material is composed of at least one kind of element A selected from Sn, In, Ge, Ga, Pb, Al, Sb, and Si, and an element X that does not substantially react with Li, and is capable of occluding/desorbing Li. As the element X, Cu, Ni, Fe, Mn, Co, Cr, Mo, W, Ti, Zr, and the like are suitable. In particular, an intermetallic compound containing at least one kind of element selected from Cu, Ni, and Fe is desirable.

As the above-mentioned intermetallic compound, $Cu_6Sn_5$, $Sb_3Co$, $SbNiMn$, $Sn_7Ni_3$, $Mg_2Sn$, and the like can be illustrated specifically. In particular, a NiAs type intermetallic compound belonging to a space group $P6_3/mmc$, such as $Cu_6Sn_5$, is used preferably since it can configure a non-aqueous secondary battery having excellent reversibility and a large capacity and being excellent in cycle characteristics. The intermetallic compound is not necessarily limited to a particular composition, and an intermetallic compound having a relative wide solubility range may be slightly shifted from a central composition. Furthermore, another element may be substituted for a part of the above-mentioned constituent elements. For example, another element M may be substituted for a main constituent element of an intermetallic compound to form a multicomponent compound, as in $Cu_{6-x}M_xSn_5$, $Cu_6Sn_{5-x}M_x$, or the like.

As the substituent element M, those which can stabilize a compound and suppress the reaction with a collector during a charging/discharging cycle are desirable. Examples of the substituent element M include metal elements (including metalloid elements and semiconductor elements) having a melting point of 700° C. or less such as Zn, Mg, Bi, In, Sb, and the like. Most of the elements belonging to the element A have a melting point of 700° C. or less. However, at least one kind of a metal element having a melting point of 700° C. or less may be contained in addition to the element A. Although the ratio of substitution may be varied depending upon the element, the ratio of M in an intermetallic compound may be set in a range of 10 atomic % or less. When the ratio of the substituent element is too high, the configuration of an original compound cannot be maintained.

The intermetallic compound is formed on a collector as an active material layer. The thickness thereof desirably is 20 μm or less. More specifically, an alloy thin film has a lower conductivity compared with a collector; therefore, when the thickness is too large, the resistance thereof is increased, which degrades high rate characteristics. Furthermore, the expansion/shrinkage of the alloy thin film is increased during charging/discharging. Consequently, the active material becomes likely to be pulverized and drop off, which decreases a charging/discharging efficiency and cycle characteristics. Therefore, the thickness desirably is confined in the above range, and more desirably is set to be 10 μm or less. On the other hand, the capacity of a negative electrode is decreased as the thickness of the active material layer becomes thinner. Therefore, the thickness is set to be desirably 1 μm or more, and more desirably 5 μm or more from a practical point of view.

Furthermore, in X-ray diffraction measurement with a CuKα-ray of an active material layer, assuming that the peak intensity of a strongest peak of a diffraction line derived from the intermetallic compound is $I_a$, and the peak intensity of a strongest peak of a diffraction line derived from the element A is $I_b$, it is desirable that the active material layer is formed so that an intensity ratio $I_b/I_a$ is 0.1 or less, and more desirable that it is formed so as to have an intensity ratio $I_b/I_a$ of 0.05 or less. This is because a charging/discharging efficiency and cycle characteristics can be enhanced by decreasing the ratio of a phase of the element A to a predetermined value or less, and increasing the ratio of the intermetallic compound. Even in an intermetallic compound, it is desirable that the ratio of a phase having no reversibility with respect to occlusion/desorption of lithium, such as $Cu_3Sn$, is lower. Assuming that the peak intensity of a strongest peak of a diffraction line derived from an intermetallic compound phase other than an intermetallic compound capable of reversibly occluding/desorbing lithium is $I_c$, the intensity ratio $I_c/I_a$ is desirably 0.05 or less, and more desirably 0.03 or less. More specifically, it is desirable that the active layer material is substantially composed of a single phase of an intermetallic compound capable of occluding/desorbing lithium.

There is no particular limit to the material and form of the collector. However, an electrolytic foil, a metal foil such as a rolled foil, a metal plate such as a perforation plate and an embossed plate, a mesh, and a metallic foam, composed of at least one kind of element selected from Cu, Ni, Fe, and Ti, or an alloy containing the element as its main constituent element, are used preferably. As described later, in order to reduce a change in strength of the collector in the case of performing heat treatment at 160° C. or higher, a small amount of elements such as Zr, Zn, and Sn may be added. The thickness of the collector desirably is set to be 5 µm or more in terms of the strength of a negative electrode and a current collecting function, and the thickness desirably is set to be 30 µm or less so as not to decrease the energy density of the negative electrode. Furthermore, in order to further enhance the durability of the negative electrode, a complex in which a metal film is formed on an organic polymer film as a collector may be used.

In the case where the main constituent element of the intermetallic compound capable of occluding/desorbing lithium constituting the active material layer is the same as that of the collector, the active material layer and the collector react with each other while the active material layer is formed or while the charging/discharging cycle is repeated, whereby the characteristics of a negative electrode may be degraded and the cycle characteristics may be decreased. For example, in the case of $Cu_6Sn_5$, if the collector is composed of Cu or a Cu alloy, Sn that is the main constituent element of $Cu_6Sn_5$ and Cu of the collector react with each other gradually along with the progress of the charging/discharging cycle, whereby the collector is degraded to lose the function as a negative electrode.

In the above-mentioned combination, by providing a protective layer between the active material layer and the collector so as to prevent the reaction therebetween, the above-mentioned problem can be solved. There is not particular limit to the material for the protective layer, as long as it has a conductivity and can prevent the reaction between the active material layer and the collector. In terms of the conductivity and durability, the protective layer preferably is composed of metal containing at least one kind of main constituent element selected from Ti, Ni, Zr, W, and Ag, or an alloy thereof. In general, a material having a melting point higher than that of the element A is selected.

In order to allow the protective layer to sufficiently suppress the reaction between the active material layer and the collector, the thickness of the protective layer desirably is set to be 0.05 µm or more, and in order to prevent the energy density of the negative electrode from decreasing, the thickness desirably is set to be 0.5 µm or less.

The negative electrode of the present invention can be produced, for example, as follows. A thin film (thickness: 10 µm or less) containing at least one kind of element A selected from Sn, In, Ge, Ga, Pb, Al, Sb, and Si and a thin film (thickness: 10 µm or less) containing the element X that is capable of forming an intermetallic compound with the element A and does not substantially react with Li are laminated alternately to form a laminated film on a collector that does not substantially react with Li. Then, the laminated film is heat-treated to combine the element A with the element X, whereby an active material layer of an intermetallic compound capable of occluding/desorbing lithium is formed. In the case of allowing the substituent element M to be contained in the intermetallic compound, it is desirable that the element M is contained in the thin film of the element A or the element X. However, the following also may be possible. A thin film of the element M is formed separately from the thin films of the element A and the element X, and the elements A, X, and M are combined during heat treatment.

By setting the thickness of one layer to be 10 µm or less in the thin films of the elements A and X, the reactivity thereof during heat treatment is enhanced, and an alloy is likely to be formed due to diffusion, so that the remaining of an unreacted substance and the generation of an unintended compound can be reduced. The reactivity of the above-mentioned thin films during heat treatment can be enhanced as they are thinner. Therefore, the thickness of the thin films is desirably 5 µm or less, and more desirably 3 µm or less. On the other hand, when the thin films are too thin, a production process is complicated. Therefore, the thicknesses of the thin films are desirably 0.5 µm or more, and more desirably 1 µm or more from a practical point of view.

Furthermore, there is no particular limit to the number of laminated thin films of the elements A and X. The number of laminated thin films may be determined appropriately in accordance with the thickness and the composition of the active material layer to be formed.

Herein, the thin film containing the element A and the thin film containing the element X can be formed by physical vapor deposition (PVD), chemical vapor deposition (CVD), a liquid phase growth method, or the like. Examples of the PDV include vapor deposition, sputtering, ion plating, molecular beam epitaxy (MBE), laser abrasion, and the like. Examples of the CVD include thermal CVD, metallorganic chemical vapor deposition (MOCVD), RF plasma CVD, electron cyclotron (ECR) plasma CVD, optical CVD, laser CVD, atomic layer epitaxy (ALE), and the like. Examples of the liquid phase growth method include plating (electroplating, electroless plating), anodic oxidation, coating, a sol-gel process, and the like. Above all, the liquid phase growth method is preferable since it can be performed in a relatively simple facility. In particular, electroplating is preferable for the following reasons. According to this method, the flatness of a plating thin film surface to be formed is satisfactory and the adhesion of the film to the surface of a collector is satisfactory, and furthermore, the film can be formed in a large area at a low cost. These methods for forming thin films may be used alone or in combination.

The heat treatment of the above-mentioned laminated film is performed in a vacuum atmosphere, an inert atmosphere, or a reduction atmosphere. The heat treatment may be performed at a temperature lower than the melting point of an element having the lowest melting point among the elements A and X. When the heat treatment temperature is too low, it takes a long time for a reaction. Therefore, the laminated film desirably is treated at a temperature that is 0.7 times the melting point or higher.

In the case of $Cu_6Sn_5$, heat treatment preferably is performed at a temperature lower than 231.9° C. that is the melting point of Sn, and more preferably is performed at 220° C. or less. The reason for this is as follows. In the case of performing heat treatment at a temperature equal to or higher than the melting point of Sn, Sn in the laminated film is eluted before reacting with Cu to form an alloy, which inhibits the formation of a uniform phase of $Cu_6Sn_5$. The heat treatment temperature may be 60° C. or higher, and in order to promote the reaction, the heat treatment preferably is performed at 160° C. or higher.

The preferable range of the heat treatment time is varied slightly depending upon the thicknesses of the thin films of the elements A and X and the heat treatment temperature. If the heat treatment time is set to be 3 hours or longer, a diffusion reaction between the elements A and X is allowed to proceed sufficiently. In particular, the heat treatment time of 5 hours or longer is preferable. In terms of a production efficiency, the heat treatment time may be set within 24 hours, and desirably within 10 hours.

In the case where the main constituent element of the collector is the one capable of being alloyed with the element A, the thin film of the element A reacts with the collector during the heat treatment, and consequently, the uniformity of the active material layer may be decreased. In such a case, by providing the above-mentioned protective layer on the collector, the reaction can be prevented, and the efficiency of forming an intended intermetallic compound can be enhanced.

As the positive active material used in the present invention, for example, a lithium cobalt oxide such as $LiCoO_2$, a lithium manganese oxide such as $LiMn_2O_4$, a lithium nickel oxide such as $LiNiO_2$, $LiNi_xCo_{(1-x)}O_2$ in which Co is substituted for a part of Ni in $LiNiO_2$, $LiNi_{(1-x)/2}Mn_{(1-x)/2}Co_xO_2$ containing an equal amount of Mn and Ni, olivine type $LiMPO_4$ (M is at least one kind of element selected from Co, Ni, Mn, and Fe), and the like can be used. A positive electrode is produced, for example, as follows. A carbon type conductive assistant, a binder such as polyvinylidene fluoride, and the like are added appropriately to the positive active material to form a mixture, and the mixture is molded so as to have a collector made of an aluminum foil as a core.

There is no particular limit to the form of the collector. In the same way as in the negative electrode, a metal foil, a metal plate such as a perforation plate and an embossed plate, a mesh, and a metallic foam are used preferably. A complex may be used in which a metal film of an aluminum film is formed on an organic polymer film as a collector.

As the non-aqueous electrolyte, any of a liquid electrolyte, a gel electrolyte, a solid electrolyte, a molten salt electrolyte, and the like can be used. In particular, the liquid electrolyte is used frequently. As a solvent for the liquid electrolyte, for example, 1,2-dimethoxyethane, 1,2-diethoxyethane, propylene carbonate, ethylene carbonate, vinylene carbonate, γ-butyrolactone, tetrahydrofuran, 1,3-dioxolane, diethyl carbonate, dimethyl carbonate, methyl ethyl carbonate, and the like can be used. These solvents can be used alone or in combination of at least two kinds. Furthermore, the components other than those described above also can be added.

As a solute to be dissolved in the above solvent, for example, lithium salts such as $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiN(CF_3SO_2)_2$, $LiC_nF_{2n+i}SO_3(n\geq 2)$, $LiN(RfOSO_2)_2$ (where Rf is a fluoroalkyl group), $LiN(CF_3SO_2)(C_4F_9SO_2)$, $LiN(C_2F_5SO_2)(C_2F_5SO_2)$, and the like can be used. These electrolyte salts can be used alone or in combination of at least two kinds.

As a separator, those which have sufficient strength and can hold a great amount of the electrolyte solution are preferable. In this respect, films non-woven fabric made of polypropylene, polyethylene, or a copolymer of propylene and ethylene, having a thickness of 10 to 50 μm and an opening ratio of 30 to 70% are used preferably.

Furthermore, a porous film containing at least two kinds of different polymers and inorganic fine particles, that can adhere to an electrode, also can be used. For this film, at least one kind of polymer having a high melting point and being stable with respect to an electrolyte solution and at least one kind of polymer that swells with an electrolyte solution at a high temperature are used. As the polymer stable with respect to the electrolyte solution, polysulfone resin and the like are used. As the polymer that swells with an electrolyte solution, an ethylene—vinyl acetate copolymer, an ethylene—acrylic acid copolymer, a vinylidene fluoride—hexafluoropropylene copolymer, an ionomer resin, and the like are used. As the inorganic fine particles, oxides having a particle size of 0.01 to 5 μm (e.g., $SiO_2$, $Al_2O_3$, $TiO_2$, $BaTiO_2$, montmorillonite, etc.) are used.

Hereinafter, the present invention will be described more specifically by way of examples. These examples are shown merely for illustrative purpose, and the present invention is not limited to these examples. In the following, "%" representing the concentration and composition of a solution and the like refers to "mass %".

EXAMPLE 1

An electrolytic copper foil (thickness: 10 μm) was cut to a size of 3 cm×5 cm. The electrolytic copper foil was soaked in 10% sulfuric acid aqueous solution heated to 40° C. for 4 minutes so as to remove an oxide coating film, oils and fats, and dirt on the surface. The electrolytic copper foil was taken out, and was subjected to anode electrolytic degreasing at a current density of 5 A/dm² for one minute in a degreasing liquid at 60° C. containing 5 g/dm³ of sodium hydroxide, 20 g/dm³ of sodium orthosilicate, 10 g/dm³ of sodium carbide (dry), and 1 g/dm³ of n-dodecyltrimethylammonium chloride. The treated copper foil was washed with distilled water, and soaked again in the 10% sulfuric acid aqueous solution to completely remove an antalkali and a surfactant on the surface of the copper foil, whereby a copper foil for electroplating used as a collector was obtained.

The resultant copper foil was subjected to electroplating at a current density of 1 A/dm² for 90 seconds in a Ni-plating bath containing 240 g/dm³ of nickel sulfate, 45 g/cm³ of nickel chloride, and 30 g/cm³ of boric acid, whereby a protective layer composed of a Ni-plating thin film with a thickness of about 0.3 μm was formed.

Then, the copper foil with the protective layer formed thereon was washed with water, and was subjected to electroplating at a current density of 1 A/dm² for 15 minutes in a Cu-plating bath containing 100 g/dm³ of copper sulfate and 100 g/dm³ of sulfuric acid, whereby a Cu-plating thin film (thickness: about 2.5 μm) was formed on the protective layer.

Furthermore, the copper foil with the Cu-plating thin film formed thereon was washed with water, and was subjected to electroplating at a current density of 1 A/dm² for 2.5 hours in a Sn-plating bath containing 40 g/cm³ of stannous sulfate, 60 g/dm³ of sulfuric acid, 40 g/dm³ of cresol sulfonic acid, 2 g/dm³ of gelatin, and 1 g/dm³ of β-naphthol, whereby a Sn-plating thin film (thickness: about 3.5 μm) was formed on the Cu-plating thin film.

Figure 2:
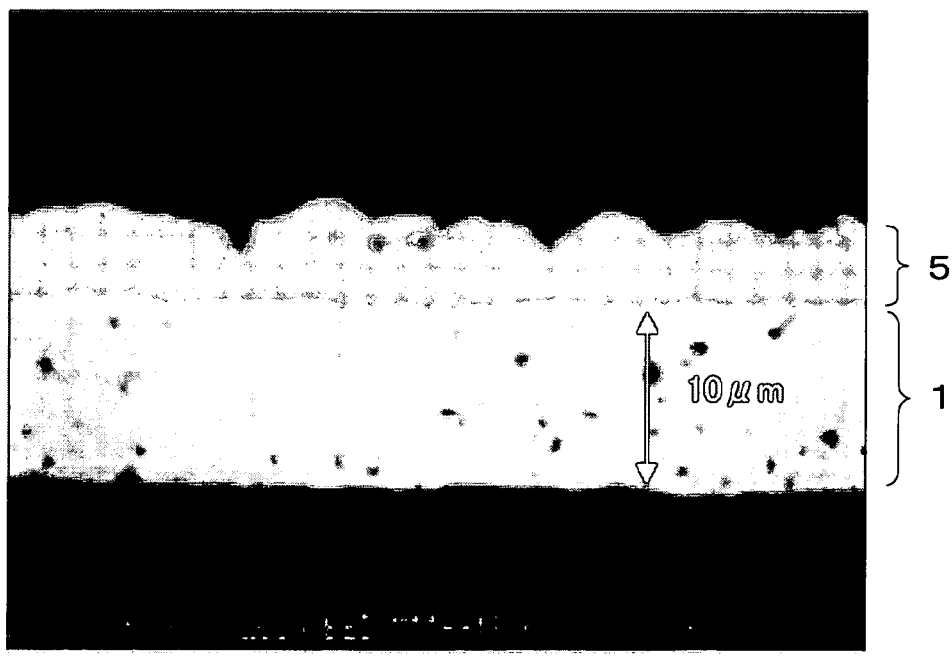
FIG. 2 is an electron micrograph showing a cross-sectional configuration of the negative electrode in Example 1.

FIG. 1 shows an electron micrograph showing a cross-sectional configuration of the collector 1 on which the laminated film composed of a protective layer 2, a Cu thin film 3, and a Sn thin film 4 is formed. This collector was washed with water. Then, the collector was heat-treated at 220° C. for 10 hours in a vacuum electric furnace to combine Cu with Sn, whereby an active material layer 5 was formed. Thus, a negative electrode for a non-aqueous secondary battery was obtained. FIG. 2 shows an electron micrograph showing a cross-sectional configuration of the produced negative electrode. It is understood that the active material layer 5 (thickness: about 6 μm) was formed, while the reaction between the collector 1 and Sn was prevented due to the presence of the protective layer 2, whereby the collector 1 maintained the original thickness.

Figure 3:
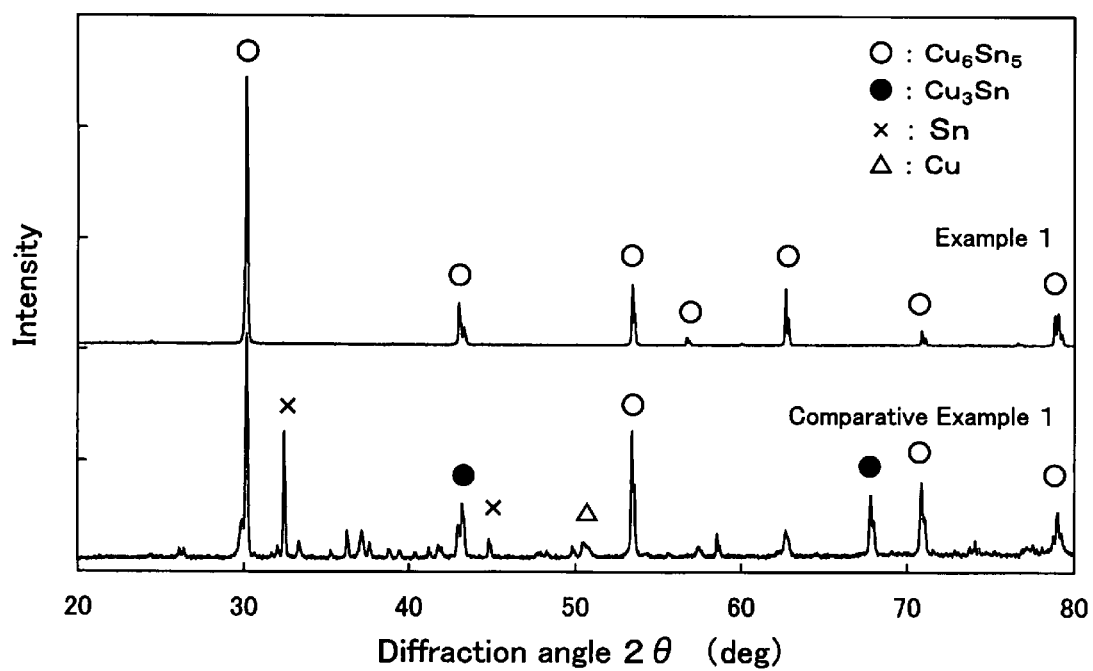
FIG. 3 is an X-ray diffraction diagram of negative active material layers in Example 1 and Comparative Example 1.

Regarding the active material layer 5 of the negative electrode, in order to check the formed compound, X-ray diffraction measurement with a CuKα-ray was performed using an X-ray diffraction measurement apparatus "RINT2500V" (produced by Rigaku Denki Co., Ltd.). FIG. 3 shows the diffraction pattern thus obtained. From FIG. 3, the remaining of an unreacted Sn phase and the formation of a $Cu_3Sn$ phase were not recognized, and a substantially single phase of $Cu_6Sn_5$ was confirmed.

EXAMPLE 2

An electrolytic copper foil (thickness: 20 μm) was cut to a size of 3 cm×5 cm. The electrolytic copper foil was subjected to cathode electrolytic degreasing in the same way as in Example 1, whereby a copper foil for electroplating used as a collector was obtained.

Figure 4:
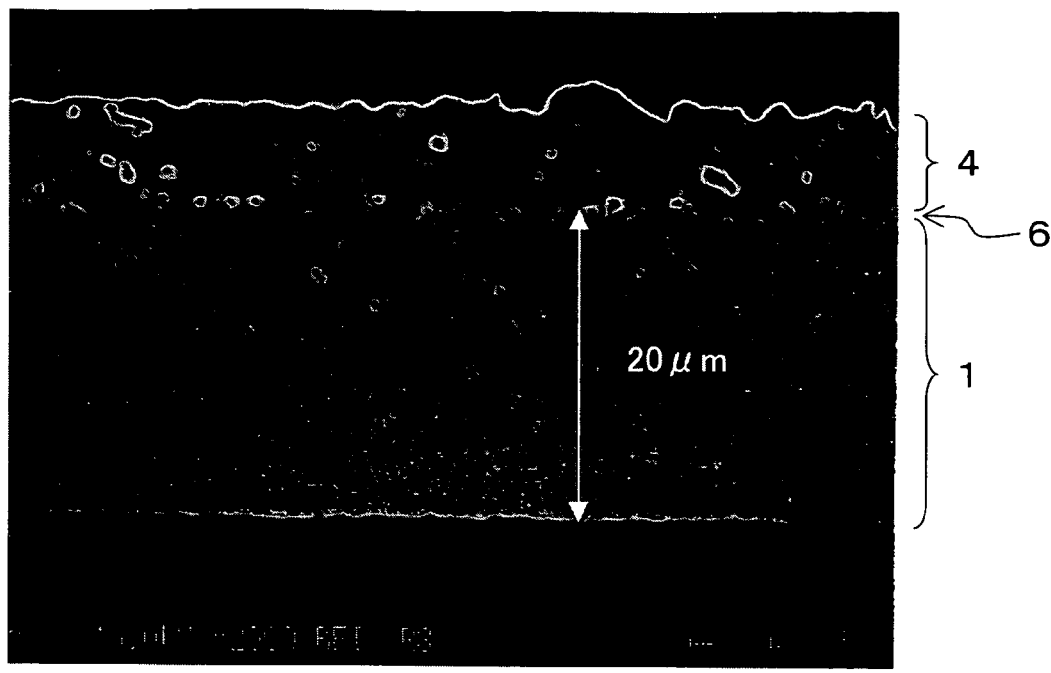
FIG. 4 is an electron micrograph showing a cross-sectional configuration of a laminate in which a laminated film composed of a Zn thin film and a Sn thin film is formed on a collector, used in a production process of a negative electrode in Example 2.
Figure 5:
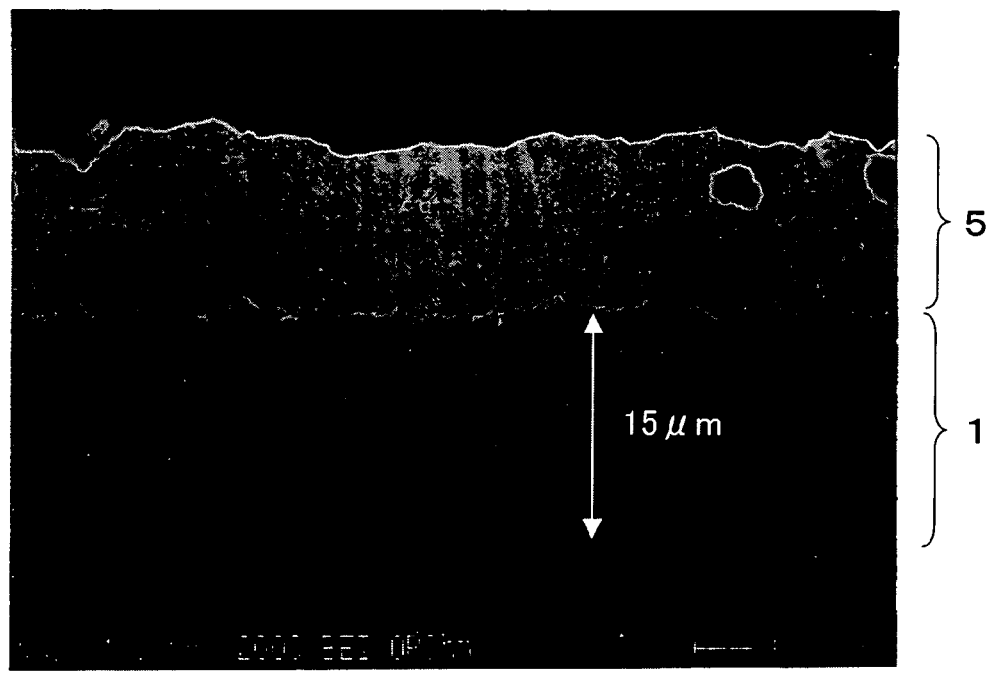
FIG. 5 is an electron micrograph showing a cross-sectional configuration of the negative electrode in Example 2.

The copper foil was subjected to electroplating at a current density of 1 $A/dm^2$ for 150 seconds in a Zn-plating bath containing 10 $g/dm^3$ of zinc, 12 $g/dm^3$ of sodium cyanide, and 80 $g/dm^3$ of sodium hydroxide, whereby a Zn-plating thin film (thickness: about 0.5 μm) was formed. Then, a Sn-plating thin film (thickness: about 6.5 μm) was formed on the Zn-plating thin film in the same way as in Example 1. FIG. 4 shows an electron micrograph showing a cross-sectional configuration of the collector 1 on which the laminated film composed of a Zn thin film 6 and a Sn thin film 4 is formed. Furthermore, the collector 1 was heat-treated under the same conditions as those in Example 1, whereby a negative electrode for a non-aqueous secondary battery was produced. FIG. 5 shows an electron micrograph showing a cross-sectional configuration of the negative electrode. As is understood from FIG. 5, a part of the collector 1 reacted with Sn, whereby an active material layer 5 (thickness: about 12 μm) was formed. Furthermore, it was found that Zn reacted with Sn or Cu to diffuse in the active material layer 5.

EXAMPLE 3

A copper foil having a protective layer made of a Ni-plating thin film (thickness: about 0.3 μm) was prepared in the same way as in Example 1. The copper foil was washed with water, and subjected to electroplating at a current density of 1 $A/dm^2$ for 90 minutes in a Cu—Zn alloy plating containing 45 $g/dm^3$ of copper cyanide, 7.5 $g/dm^3$ of zinc cyanide, 75 $g/dm^3$ of sodium cyanide, 7.5 $g/dm^3$ of sodium carbide, 10 $g/dm^3$ of sodium bicarbonate, and 0.6 $cm^3/dm^3$ of ammonium water, whereby a Cu—Zn alloy (Zn content: 1.7%) plating thin film (thickness: about 3 μm) was formed. Furthermore, in the same way as in Example 1, a Sn-plating thin film (thickness: about 5 μm) was formed on the alloy plating thin film. Thereafter, the same processes as those in Example 1 were performed to produce a negative electrode for a non-aqueous secondary battery. The active material layer of the negative electrode in Example 3 contained Cu and Sn as main constituent elements, and further contained Zn.

EXAMPLE 4

An electrolytic copper foil (thickness: 10 μm) was cut to a size of 3 cm×5 cm. The electrolytic copper foil was subjected to cathode electrolytic degreasing in the same way as in Example 1, whereby a copper foil for electroplating used as a collector was obtained.

In the same way as in Example 1, a Cu-plating thin film (thickness: about 0.6 μm) and a Sn-plating thin film (thickness: about 1 μm) were laminated alternately on the copper foil, whereby a laminated film having five Cu-plating thin films and five Sn-plating thin films was formed. Thereafter, a negative electrode for a non-aqueous secondary battery was produced in the same way as in Example 1.

COMPARATIVE EXAMPLE 1

An electrolytic copper foil (thickness: 18 μm) was cut to a size of 3 cm×5 cm. The electrolytic copper foil was subjected to cathode electrolytic degreasing in the same way as in Example 1, whereby a copper foil for electroplating used as a collector was obtained.

Figure 6:
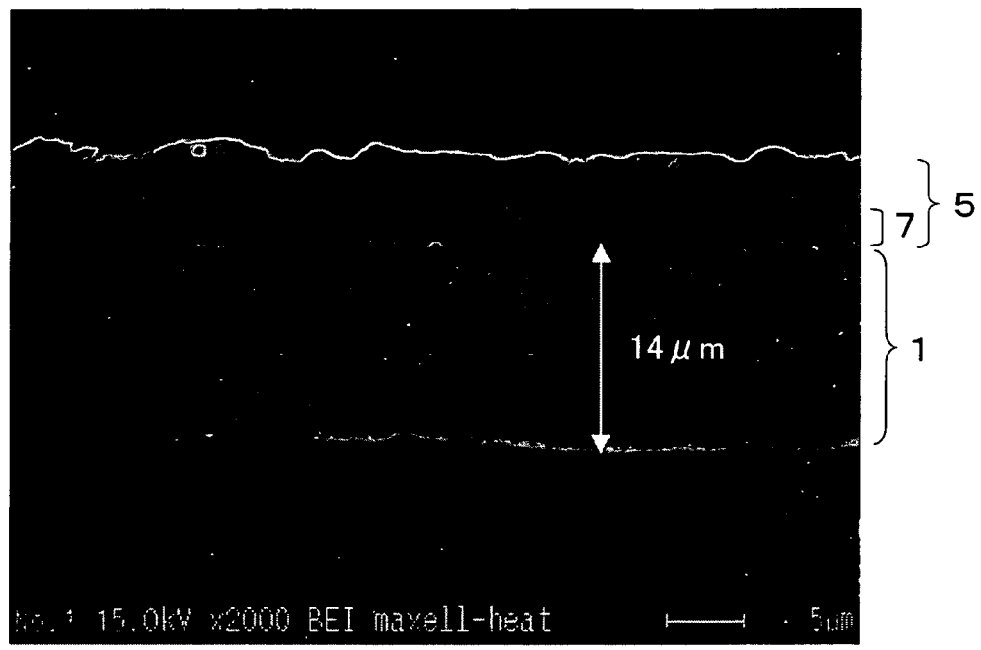
FIG. 6 is an electron micrograph showing a cross-sectional configuration of a negative electrode in Comparative Example 1.

A Sn-plating thin film (thickness: about 2 μm) was formed directly on the copper foil in the same way as in Example 1, and the resultant copper foil was heat-treated under the same conditions as those in Example 1, whereby a negative electrode for a non-aqueous secondary battery was produced. The cross-sectional configuration of the negative electrode was observed with an electron microscope, and the active material layer was measured by X-ray diffraction. FIG. 6 shows an electron micrograph of the cross-section. Furthermore, FIG. 3 shows the X-ray diffraction diagram thus obtained together with the results of Example 1. It is understood from FIG. 3 that a part of the collector 1 reacted with Sn to form an active material layer 5 (thickness: about 6 μm), and the thickness of the collector 1 was decreased to about 14 μm. Furthermore, a $Cu_3Sn$ layer 7 was confirmed to be formed in the vicinity of the interface between the active layer material 5 and the collector 1.

Regarding the negative active material layers in Examples 1 to 4 and Comparative Example 1, highest peak intensities $I_a$, $I_b$, and $I_c$, of diffraction peaks derived from $Cu_6Sn_5$, $Cu_3Sn$, and Sn among diffraction peaks obtained by X-ray diffraction measurement with a CuKα-ray were obtained. Table 1 shows the results obtained by calculating the intensity ratios $I_b/I_a$ and $I_c/I_a$.

TABLE 1

| | Peak intensity ratio | | Initial discharging capacity | Initial charging/ discharging | Cycle characteristics |
|---|---|---|---|---|---|
| | $I_b/I_a$ | $I_c/I_a$ | (mAh) | efficiency (%) | (%) |
| Example 1 | 0 | 0 | 5.9 | 85 | 90 |
| Example 2 | 0.02 | 0.02 | 4.6 | 88 | 88 |
| Example 3 | 0 | 0 | 6.0 | 86 | 92 |
| Example 4 | 0.05 | 0.03 | 4.4 | 75 | 70 |
| Comparative Example 1 | 0.57 | 0.28 | 2.5 | 57 | 20 |

In the negative electrodes in Examples 1 to 4, the remaining of a Sn phase and generation of a $Cu_3Sn$ phase were hardly recognized, and an active material layer, in which a generation ratio of $Cu_6Sn_5$ that is an intermetallic compound capable of occluding/desorbing lithium was enhanced, was formed. Particularly, in Examples 1 and 3 in which the protective layer was provided on the collector, and in Examples 2 and 3 in which the active material layer contained Zn, the ratios of the Sn phase and the $Cu_3Sn$ phase were reduced compared with Example 4.

Next, the respective negative electrodes in Examples 1 to 4 and Comparative Example 1 were combined with the following positive electrode, electrolyte solution, and separator to constitute non-aqueous secondary batteries. These batteries were evaluated for a discharging capacity, a charging/discharging efficiency, and cycle characteristics.

The negative electrode was used under the condition of being punched to a circular shape with a diameter of 16 mm in an argon atmosphere. The positive electrode was obtained by punching an electrode with a mixture layer (density: 3.2 g/cm$^3$) containing 90% LiCoO$_2$ as an active material formed on one surface of an aluminum foil (thickness: 20 μm) into a circular shape with a diameter of 15 mm.

Furthermore, the electrolyte solution was obtained by dissolving LiPF$_6$ in a mixed solvent containing ethylene carbonate and methyl ethyl carbonate (volume ratio 1:2) in an amount of 1.2 mol/dm$^3$. As the separator, a porous polyethylene film (Trade Name "Setila" EMM25, produced by Tonen Chemical Nasu Corp.) having a thickness of 25 μm was used.

The produced non-aqueous secondary batteries were charged with a constant current up to 4.2 V at a current density of 0.2 mA/cm$^2$ and 25° C., and then, was discharged up to 3 V at a current density of 0.2 mA/cm$^2$. The discharging capacity at this time was set to be an initial discharging capacity, and the ratio of the initial discharging capacity with respect to the charging capacity was set to be an initial charging/discharging efficiency, whereby the characteristics of the negative electrode were evaluated.

Figure 7:
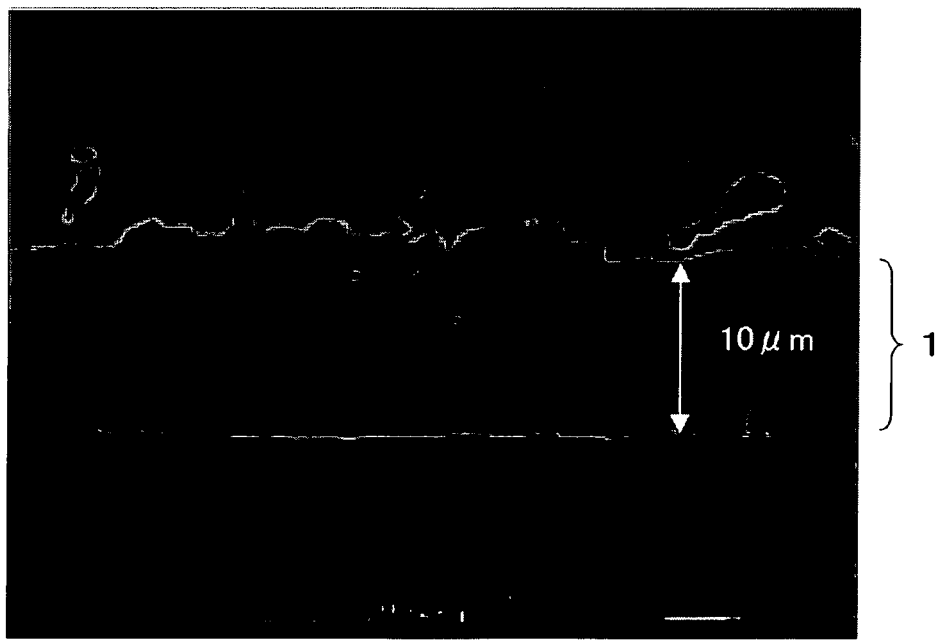
FIG. 7 is an electron micrograph showing a cross-sectional configuration of the negative electrode after a charging/discharging cycle in Example 1.
Figure 8:
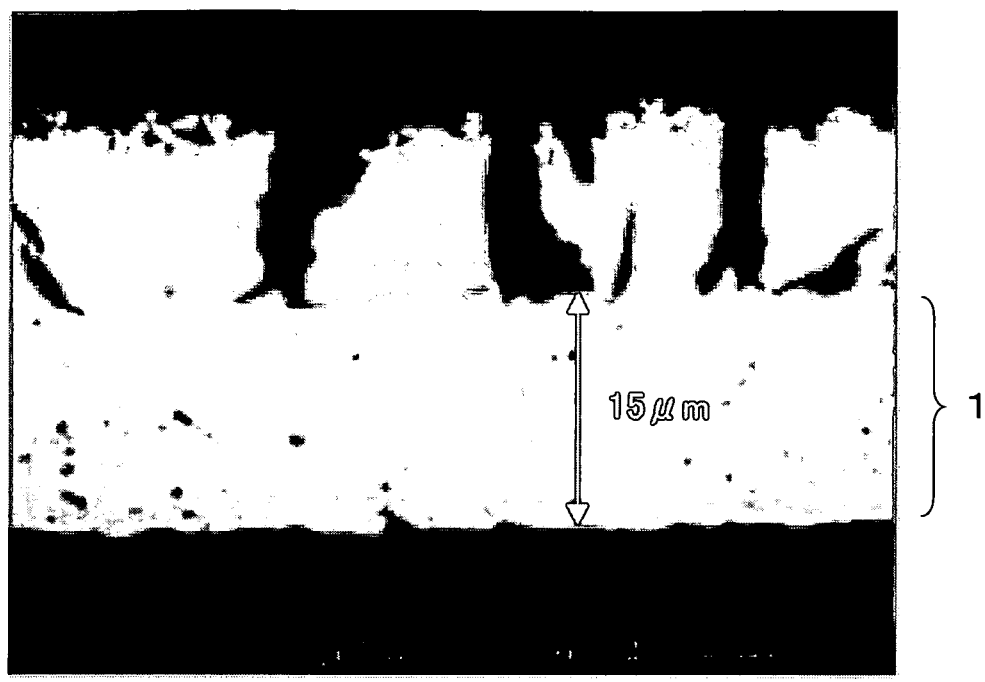
FIG. 8 is an electron micrograph showing a cross-sectional configuration of the negative electrode after a charging/discharging cycle in Example 2.
Figure 9:
FIG. 9 is an electron micrograph showing a cross-sectional configuration of the negative electrode after a charging/discharging cycle in Comparative Example 1.

Furthermore, the charging/discharging cycle under the above conditions was repeated, and the discharging capacity at a 50th cycle was measured. The ratio of the discharging capacity at a 50th cycle with respect to the initial discharging capacity was evaluated as cycle characteristics. Table 1 shows the measurement results of the above-mentioned initial discharging capacity, initial charging/discharging efficiency, and cycle characteristics. FIG. 7 to 9 show electron micrographs of cross-sections of the negative electrodes after a charging/discharging cycle in Examples 1 and 2, and Comparative example 1. In the negative electrodes of the non-aqueous secondary batteries in Examples 1 and 2, even if a charging/discharging cycle was repeated, a change in thickness of the collector was not recognized compared with that before charging/discharging. However, in the negative electrode of the non-aqueous secondary battery in Comparative Example 1, it was found that the active material layer reacted with the collector during a charging/discharging cycle, and the thickness of the collector was decreased by 14% from about 14 μm to about 12 μm compared with that before charging/discharging. Therefore, in the non-aqueous secondary battery in Comparative Example 1, the discharging capacity was substantially decreased with the progress of a charging/discharging cycle.

As described above, by forming an active material layer of a negative electrode, using an intermetallic compound capable of occluding/desorbing lithium, and setting the presence ratio of the intermetallic compound to be a predetermined value or more, an excellent non-aqueous secondary battery can be configured, which has a high charging/discharging efficiency and whose capacity is decreased less even with the repetition of a charging/discharging cycle. Furthermore, by providing a protective layer between an active material layer and a collector for preventing the reaction therebetween, excellent characteristics of the active material layer can be maintained even if a charging/discharging cycle is repeated.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A non-aqueous secondary battery comprising:
   a positive electrode;
   a non-aqueous electrolyte; and
   a negative electrode comprising a collector, an intermetallic compound as an active material layer that occludes/desorbs lithium, and a conductive layer on the collector,
   wherein a conductive layer is disposed between the active material layer and the collector, contains at least one kind of element selected from Ti, Ni, Zr, W and Ag, and has a thickness of 0.05 to 0.5 μm, and
   wherein the intermetallic compound is a single phase and contains at least one kind of element A selected from Sn, In, Ge, Ga, Pb, Al, Sb, and Si, and an element X that does not substantially react with Li, wherein X is at least one kind of element selected from Cu, Ni, Fe, Mn, Co, Cr, Mo, W, Ti, and Zr, and
   wherein in X-ray diffraction measurement with a CuKα-ray of the active material layer, highest peak intensities of diffraction lines derived from the intermetallic compound and the element A are represented by $I_a$ and $I_b$, respectively, and an intensity ratio $I_b/I_a$ is 0.1 or less.

2. The non-aqueous secondary battery according to claim 1, wherein the element X is at least one kind of element selected from Cu, Ni, and Fe.

3. The non-aqueous secondary battery according to claim 1, wherein the intermetallic compound is a NiAs type intermetallic compound belonging to a space group P6$_3$/mmc.

4. The non-aqueous secondary battery according to claim 3, wherein, the NiAs type intermetallic compound is Cu$_6$Sn$_5$.

5. The non-aqueous secondary battery according to claim 1, wherein a highest peak intensity of a diffraction line derived from an intermetallic compound phase other than the intermetallic compound capable of occluding/desorbing lithium is represented by $I_c$, and an intensity ratio $I_c/I_a$ is 0.05 or less.

6. The non-aqueous secondary battery according to claim 1, wherein a thickness of the active material layer is 20 μm or less.

7. The non-aqueous secondary battery according to claim 1, wherein a thickness of the active material layer is 10 μm or less.

8. The non-aqueous secondary battery according to claim 1, wherein the collector is composed of at least one kind of element selected from Cu, Ni, Fe, and Ti, and an alloy thereof.

* * * * *